(12) United States Patent
Begin

(10) Patent No.: US 7,942,385 B2
(45) Date of Patent: May 17, 2011

(54) ADJUSTABLE RAILING POST BRACKET

(75) Inventor: Rejean Begin, Magog (CA)

(73) Assignee: Aluspek Products, Inc., Quebec (CA)

( * ) Notice: Subject to any disclaimer, the term of this patent is extended or adjusted under 35 U.S.C. 154(b) by 150 days.

(21) Appl. No.: 12/236,974

(22) Filed: Sep. 24, 2008

(65) Prior Publication Data
US 2009/0184302 A1 Jul. 23, 2009

Related U.S. Application Data

(60) Provisional application No. 60/975,057, filed on Sep. 25, 2007.

(51) Int. Cl.
E04H 17/22 (2006.01)
(52) U.S. Cl. .......................... 256/65.14; 256/64; 403/258
(58) Field of Classification Search ............... 256/65.04, 256/65.14; 52/297, 298; 182/113; 403/256, 403/258, 363
See application file for complete search history.

(56) References Cited

U.S. PATENT DOCUMENTS

| | | | | |
|---|---|---|---|---|
| 3,256,658 A | * | 6/1966 | Seery | 52/292 |
| 3,863,900 A | * | 2/1975 | Dagiel et al. | 256/59 |
| 3,881,699 A | * | 5/1975 | Nusbaum | 256/59 |
| 4,363,467 A | * | 12/1982 | Bos | 256/68 |
| 6,039,150 A | * | 3/2000 | Palmer | 182/113 |
| 6,679,482 B2 | * | 1/2004 | Allenbaugh | 256/65.14 |
| 7,234,689 B2 | * | 6/2007 | Kuenzel | 256/59 |
| 2007/0241317 A1 | * | 10/2007 | Kuenzel | 256/65.14 |

* cited by examiner

Primary Examiner — Joshua T Kennedy
(74) Attorney, Agent, or Firm — Bourque & Associates, P.A.

(57) ABSTRACT

A rail post bracket includes a base with longitudinal members extending up from the base creating a square or rectangular surround for insertion of a rail post support and a rail post. The rail post support is inserted first following which the rail posts can be inserted over the rail post support and removed from the bracket to avoid the need for securing the rail posts into place using grout or concrete. The bracket base is attachable to any solid surface using bolts placed through bolt holes located in the base. Attached to the bottom of the base are adjustable feet for leveling of the rail post bracket. An adjustable mechanism is attached to and partially inset in the front longitudinal member to assist in leveling the rail post. Together these features enable a rail to be leveled in every direction and can be adjusted over time if the mounting surface moves and settles, as well as enabling the easy removal and replacement of rail posts.

11 Claims, 5 Drawing Sheets

ADJUSTABLE RAILING POST BRACKET

CROSS REFERENCE TO RELATED APPLICATION

This application claims priority to U.S. Patent Application No. 60/975,057 filed on Sep. 25, 2007 entitled "Adjustable Railing Rail Post Bracket", which is incorporated fully herein by reference.

TECHNICAL FIELD

The present invention relates to an adjustable rail post bracket for use in constructing a safety rail for balconies, porches, decks and the like and more particularly, relates to a rail post bracket having multiple adjustable feet and an adjustable wedge to level the rail post bracket and attached rail post.

BACKGROUND INFORMATION

Many different types of rail post brackets have been used to secure a rail post to its intended surface. Initially rail post brackets were secured in concrete filled holes. In addition to securing rail post brackets in cement filled holes later methods also included filling the base of the rail post bracket with cement to more securely hold the rail post bracket in place. However, these methods prevent adjustment of the rail post bracket after the concrete cures and requires the rail to be level before it is fixed into position, thereby preventing subsequent adjustment.

Other rail post brackets contain additional bolted bracket elements that surround the sides of the bracket to more securely hold a rail post. The addition of a bolted bracket allows for some leveling of a rail post after the concrete has cured. The bolted bracket allows the rail post to be moved laterally by loosening the bolts to move the bracket and level the rail post. However, the adjustment of the rail post in these brackets still limits leveling because it can only be adjusted laterally.

Yet other types of rail post brackets provide a rigid base for attachment to a solid surface with four walls attached perpendicularly to the base. These bases contain bolt holes for securing the bracket to any solid surface using the necessary bolts for the specified surface. Since these brackets are attachable to any solid surface they can be used on surfaces that are above base level because they do not require being concreted into the solid surface. However, these brackets are not adjustable and therefore if the surface they are mounted to is not level the rail railing will not be level.

Accordingly what is needed is a fully adjustable rail post bracket that is adjustable in all directions to enable complete leveling of the base on any uneven surface. Such a bracket should have an adjustment method for leveling the rail post, and should not require being cemented into the solid surface.

SUMMARY

The present invention features a rail post bracket that can be easily mounted onto a solid surface with adjustable feet and one or more adjustment mechanisms for leveling the bracket and rail post located within the bracket in multiple directions. This bracket can be easily mounted with bolts to any solid surface, such as concrete, steel, or wood. Since this bracket is attachable by bolts, it enables the bracket to be removed or adjusted as necessary.

A number of longitudinal members of one or more lengths are attached perpendicularly to the base and form generally a square or rectangular surround to hold a rail support post over which is inserted a rail post. The rail posts are secured into place upon being inserted into the rail bracket over the rail support post using a fastening mechanism which draws the rail support post and rail tightly against an upright member of the bracket. The rail post can, using an adjustment mechanism located in the support bracket, be adjusted vertically, up and down. Since the rail post is not cemented into the bracket it can be removed and/or replaced if necessary.

The present invention includes adjustable feet located on the bottom of the base. Each foot is adjustable from the top of the base to allow for the rail post bracket to be leveled at any time. Since the base contains multiple adjustable feet the bracket can be leveled in all directions. Also since the feet adjustment mechanisms are located on the top of the bracket it can be re-leveled at any time if the surface which the bracket is secured to, settles or moves.

It is important to note that the present invention is not intended to be limited to a system or method, which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
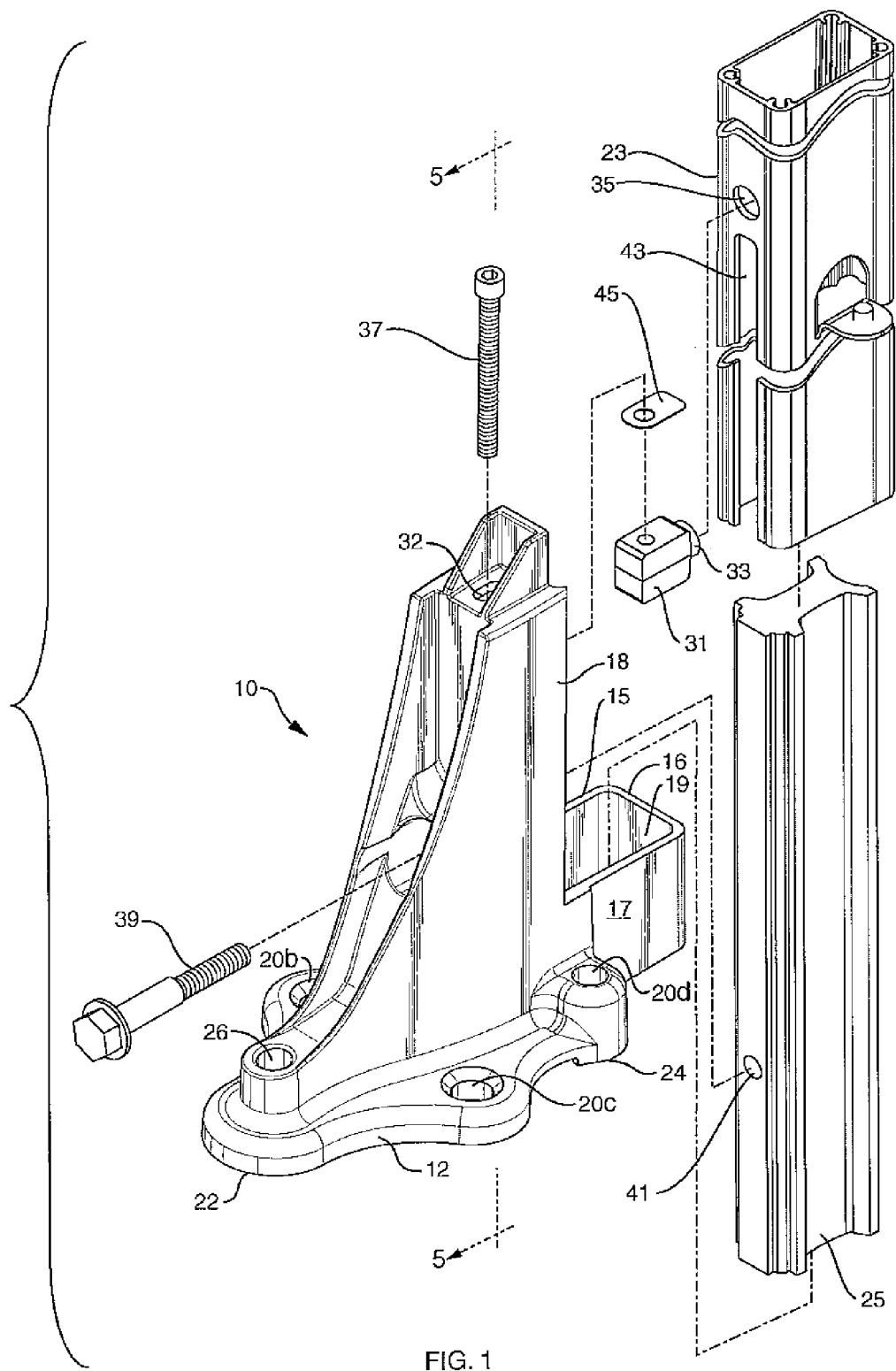
FIG. 1 is a perspective view of a rail post bracket with dashed lines showing the interior make up of the bracket according to one embodiment of the present invention.
Figure 2:
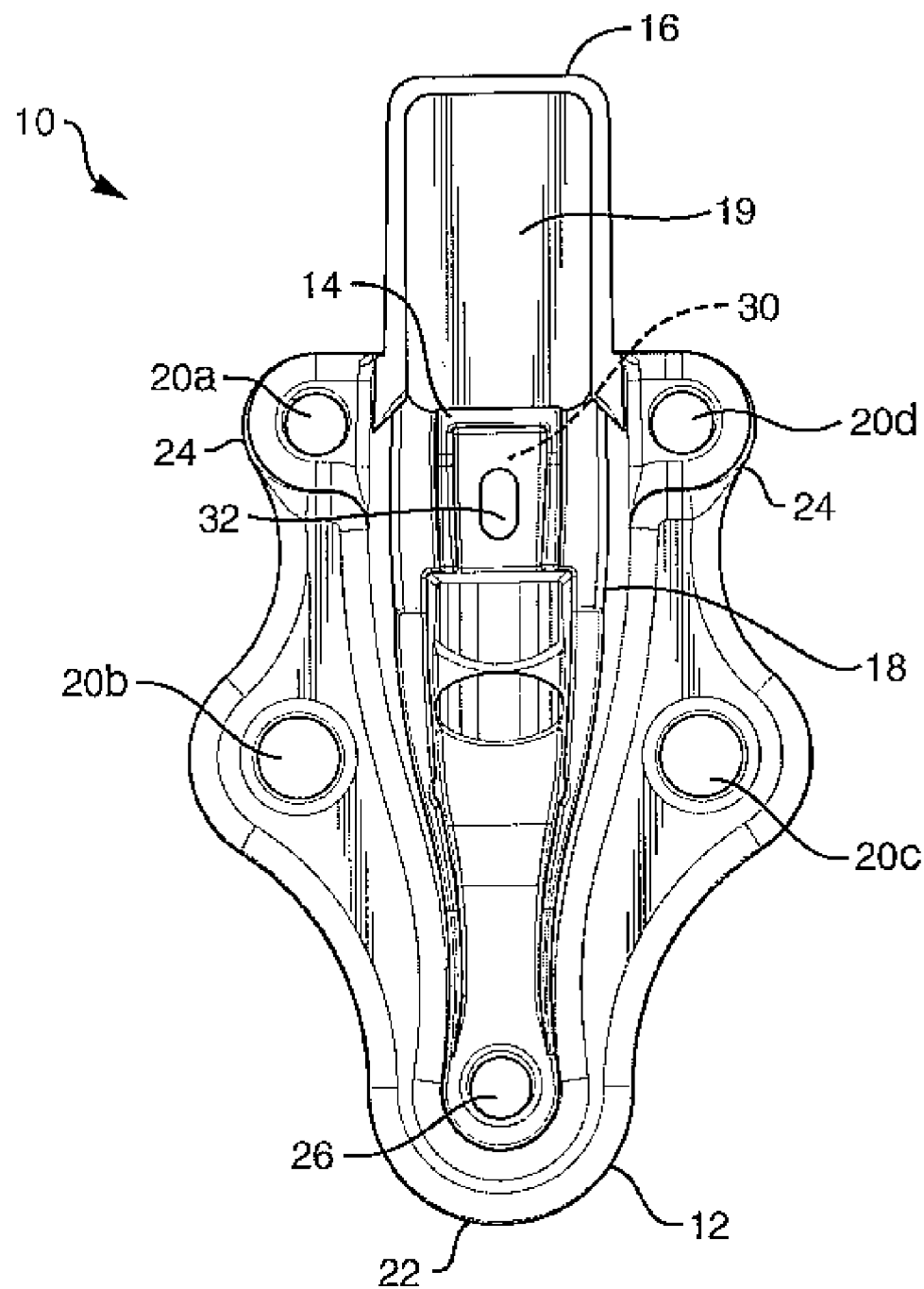
FIG. 2 is a top view of the rail post bracket according to one embodiment of the present invention.
Figure 3:
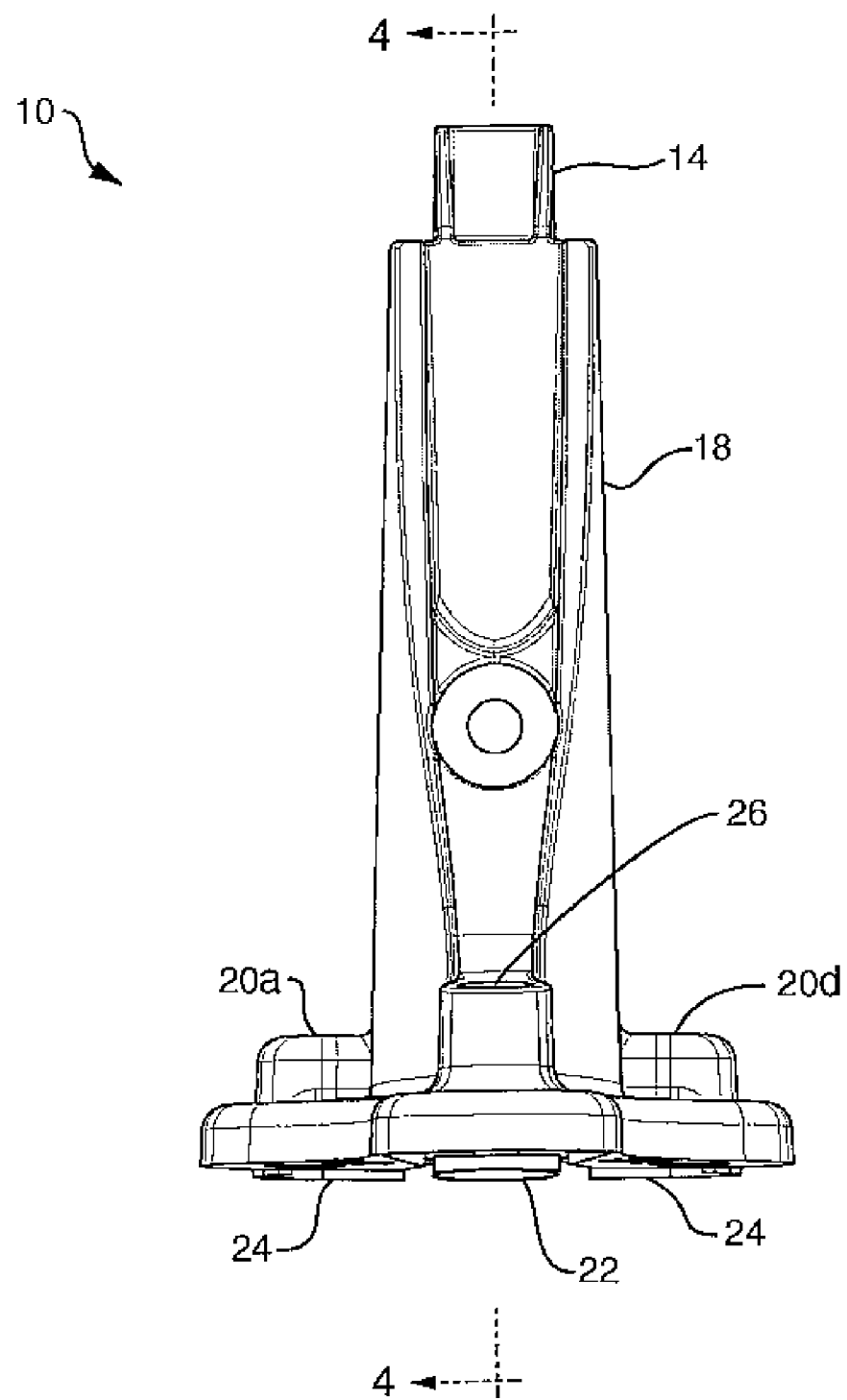
FIG. 3 is a front view of the rail post bracket according to one embodiment of the present invention.
Figure 4:
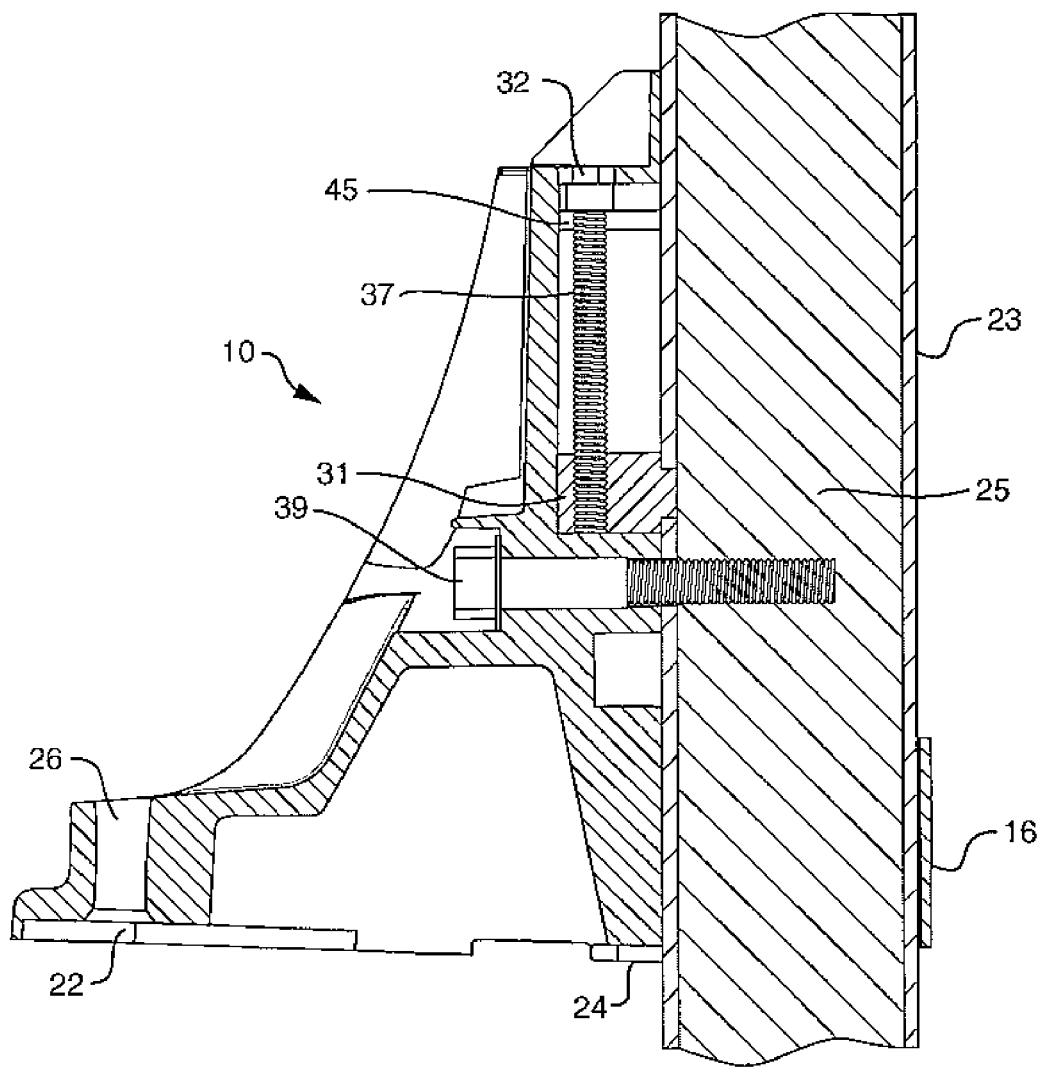
FIG. 4 is a cross-sectional view taken along lines 4-4 of FIG. 3.
Figure 5:
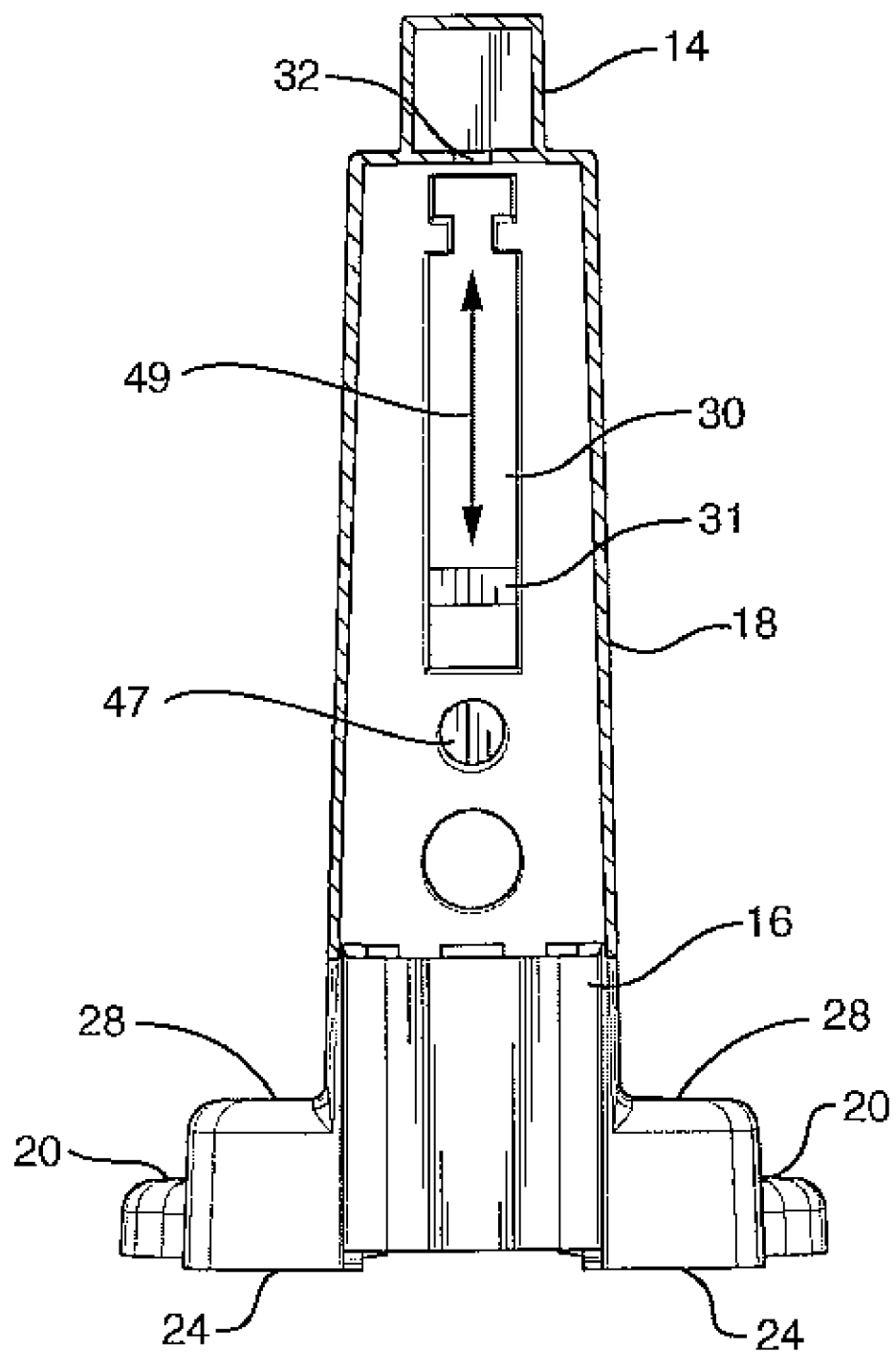
FIG. 5 is a rear view along lines 5-5 of FIG. 1.

A rail post bracket 10, FIGS. 1-5, according to the preferred embodiment of present invention, is preferably made at least partially from a relatively rigid metal, such as aluminum, with sufficient strength to hold a rail post. Bracket 10 is composed of a base 12 and an upright member 18 extending up perpendicularly from base 12. Upright member 18, back longitudinal member 16, and two side longitudinal members 15 and 17 form a square or rectangular surround to hold a rail post 23 that is inserted over a rail post support 25 in the central region 19 formed by the longitudinal members. Longitudinal members 15, 17, and 16 abut each other to form the corners of the square or rectangular surround.

In the preferred embodiment, the upright member 18 is the tallest of the longitudinal members, while the side longitudinal members 15, 16 and 17 are shorter.

Base 12 preferably includes five bolt holes 20a-20d and 26. Bolts inserted into bolt holes 20a, 20d and 26 are for leveling bolts which contact with the floor or substrate to which the bracket is attached. Bolts inserted into bolt holes 20b and 20c are for securing bracket 10 to a solid surface. Bolt holes 20b and 20c allow for any type of bolt to be used to secure bracket 10 to the specified surface. This enables the user to match the bolt type to the surface that bracket 10 is being attached to.

Attached to base 12 are multiple adjustable feet such as, for example, a front foot 22 and two rear feet 24. Front foot 22 is attached to the bottom of base 12 and is adjustable from the top of base 12 through a front adjustment hole or opening 26. Front foot 22 is adjustable by a screw with a hex set bolt head located inside front adjustment opening 26. Rear feet 24 are located on the bottom of base 12 and are adjustable from the top of base 12 through rear adjustment openings 20a and 20d. The rear feet 24 are adjustable by screws with hex set bolt heads located inside rear adjustment openings 20a and 20d. The feet may be made from the same material as the bracket or a different material. For example, to prevent corrosion of the bracket, the feet may be made of a non-corrosive material such as stainless steel. Since feet 22 and 24 are attached to base 12 and provide a buffer between the attachment surface and bracket 10 they provide corrosive isolation. Therefore, bracket 10 does not have to be made from a non-corrosive material. Other materials are contemplated for the bracket and feet including carbon-reinforced material and the like.

By adjusting front foot 22 and rear feet 24, bracket 10 can be adjusted back-to-front; side-to-side; and various combinations thereof on any surface. Since each foot is independently adjustable, bracket 10 can be leveled on any uneven surface. Top adjustment of front foot 22 and rear feet 24 enable bracket 10 to be adjusted at any time and therefore bracket 10 can be leveled during installation as well as in the future to account for movement in the attachment surface. Since front foot 22 and rear feet 24 contact the solid surface that bracket 10 is attached to, feet 22 and 24 are preferably made of a non-corrosive material, such as stainless steel.

Upright member 18 contains a channel 30 open to central region 19 of the rectangular surround created by the longitudinal members 15-17. Within this channel a vertically displaceable member 31 and washer 45 are located. Vertically displaceable member 31 protrudes generally into the rectangular surround area 30 created inside the member 18 and includes a protrusion 33 that engages with opening 35 in rail post 23. Turning threaded bolt 37 that is coupled to vertically displaceable member 31 is used to vertically level or adjust a rail post 23 within a plane of travel as shown by arrow 49 once inserted into the rectangular surround. Vertically displaceable member 31 is adjustable from the top of bracket 10 by means of a bolt 37 with a hex set head located in adjustment slot 32 to level a rail post once inserted into bracket 10. This enables a rail post to be leveled vertically as shown by arrow 49 both during installation and after installation when bracket 10 has already been leveled.

To use the rail post bracket in accordance with the present invention, the bracket 10 is first secured to the substrate using bolts as previously described. Next, rail post support 25 is inserted into opening 19 and threaded bolt 39 which passes through opening 47 in upright member 18 is threadably engaged with hole 41 located on the front face of the rail support post 25. Next, rail post 23, which is sized slightly larger than rail post support 25, is slid over and around rail post support 25. The bottom of rail post 23 may extend only to the bottom of bracket 10 or alternatively, opening 19 may overhang any substrate and thus the rail post 23 may extend below the base of the bracket 10. This is particularly useful if it is desired to put in place a panel to conceal the substrate and bracket 10. Slot 43 disposed in the rail post 23 is provided to allow an opening for bolt 39 that engages with the rail support post 25. Once the rail post 23 has been positioned over the rail post support 25 in the desired position, bolt 39 is tightened which in turn holds rail post support 25 toward and against upright member 18 thereby squeezing the rail post 23 between the rail post support in the upright member 18 holding emplace. To adjust the height of the rail post 23, bolt 39 is loosened a bit and subsequently bolt 37 is turned clockwise or counterclockwise to raise or lower rail post 23.

Accordingly, the present invention provides a fully adjustable rail post bracket that can be fully adjusted to account for an uneven mounting surface.

Modifications and substitutions by one of ordinary skill in the art are considered to be within the scope of the present invention, which is not to be limited except by the following claims. As mentioned above, the present invention is not intended to be limited to a system or method which must satisfy one or more of any stated or implied objectives or features of the invention and should not be limited to the preferred, exemplary, or primary embodiment(s) described herein. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention which is not to be limited except by the allowed claims and their legal equivalents.

The invention claimed is:

1. A rail post assembly, comprising:
    a rail post;
    a rail post support slidable within said rail post; and
    a rail post bracket, comprising:
    a base member having a plurality of bolt holes therein for attaching said rail post assembly to said solid surface;
    a substantially vertical support member extending up from said base member and forming an open area along at least a top region to circumscribe said rail post in said open area, the substantially vertical support member including a plurality of longitudinal members intersecting at right angles to form a cross-section corresponding generally to a cross section of said rail post, said substantially vertical support member configured such that said rail post support and said rail post may be inserted into said bracket through said open area;
    a rail post vertical adjustment device mounted within the vertical support member and engaging said rail post for selectively adjusting the vertical position of said rail post relative to said substantially vertical support member; and
    a rail post support securing device securing and fixing into position said rail post support against said substantially vertical support member, said rail post support securing device also immobilizes said rail post by squeezing said rail post between said substantially vertical support member and said rail post support to prevent any relative movement between said rail post and said substantially vertical support member.

2. The rail post assembly of claim 1 wherein said base member is larger than said substantially vertical support member.

3. The rail post assembly of claim 1, further comprising a plurality of adjustable feet extending through a plurality of adjustment openings in the base member, at least one of said plurality of adjustable feet adjusting a front-to-back orientation of the rail post bracket and at least one other of said plurality of adjustable feet adjusting a side-to-side orientation of said rail post bracket with respect to the solid surface.

4. The rail post assembly of claim 3, wherein said plurality of adjustable feet are made from -stainless steel.

5. The rail post assembly of claim 3 wherein said plurality of adjustable feet are independently adjustable to level said rail post bracket.

6. The rail post assembly of claim 1 wherein said rail post vertical adjustment device is adjustable for securing said rail post in a level position.

7. The rail post assembly of claim 1 further comprising bolts extending through the plurality of bolt holes in the base member for attachment of said rail post bracket to a concrete surface.

8. The rail post assembly of claim 1 wherein said rail post support securing device includes a bolt inserted through said rail post bracket into a threaded hole in said rail post support.

9. The rail post assembly of claim 1, wherein the rail post further includes an open-ended slot to accept said rail post support securing device therein to allow for relative movement between the rail post and the rail post support when the rail post securing device is at least partially inserted into the rail post support.

10. The rail post assembly of claim 1, further comprising at least one adjustable foot extending through at least one adjustment opening in the base member, the at least one adjustable foot adjusting one of a front-to-back orientation of the rail post bracket and a side-to-side orientation of said rail post bracket with respect to the solid surface.

11. The rail post assembly of claim 10, wherein said at least one adjustable foot is made from stainless steel.

* * * * *